United States Patent

Arai et al.

[11] Patent Number: 5,807,031
[45] Date of Patent: Sep. 15, 1998

[54] THROW-AWAY TIP AND THROW-AWAY TYPE CUTTER

[75] Inventors: Tatsuo Arai; Takayoshi Saito; Yoshihiko Kimura, all of Ibaragi-ken, Japan

[73] Assignee: Mitsubishi Materials Corp., Tokyo, Japan

[21] Appl. No.: 610,583

[22] Filed: Mar. 7, 1996

[30] Foreign Application Priority Data

| Mar. 10, 1995 | [JP] | Japan | 7-051583 |
| May 10, 1995 | [JP] | Japan | 7-111889 |
| Jun. 1, 1995 | [JP] | Japan | 7-135415 |

[51] Int. Cl.$^6$ .................................................. B23P 15/28
[52] U.S. Cl. ........................ 407/113; 407/114; 407/115; 407/116
[58] Field of Search ........................... 83/835, 836, 839, 83/840, 841, 842, 843, 844, 853, 855; 407/42, 113, 114, 115, 116

[56] References Cited

U.S. PATENT DOCUMENTS

| Re. 32,636 | 4/1988 | Stashko | 407/114 |
| 3,947,937 | 4/1976 | Hertel | 407/114 |
| 4,189,265 | 2/1980 | Arnold et al. | 407/114 |
| 4,247,232 | 1/1981 | McCreery et al. | 407/114 |
| 4,273,480 | 6/1981 | Shirai et al. | 407/114 |
| 4,288,179 | 9/1981 | Kruger et al. | 407/114 |
| 4,318,645 | 3/1982 | McCreery | 407/114 |
| 4,915,548 | 4/1990 | Fouquer et al. | 407/114 |
| 4,941,780 | 7/1990 | Takahashi | 407/114 |
| 5,193,947 | 3/1993 | Bernadic et al. | 407/116 X |
| 5,203,649 | 4/1993 | Katbi et al. | 407/116 X |
| 5,207,538 | 5/1993 | Satran | 407/116 X |
| 5,207,748 | 5/1993 | Katbi et al. | 407/116 X |
| 5,230,591 | 7/1993 | Katbi et al. | 407/116 X |

FOREIGN PATENT DOCUMENTS

| 52-45789 | 4/1977 | Japan | 407/114 |
| 59-1105 | 1/1984 | Japan | 407/114 |
| 1355037 | 5/1974 | United Kingdom | 407/114 |
| 94/16847 | 8/1994 | WIPO | 407/114 |

Primary Examiner—Maurina T. Rachuba
Attorney, Agent, or Firm—Anthony J. Casella; Gerald E. Hespos; Ludomir A. Budzyn

[57] ABSTRACT

The invention is designed to improve a cutting performance and a spiral chip discharging ability. Main cutting edges 16 and auxiliary cutting edges 18 are formed along the respective sides of an upper surface 14 of a negative throw-away tip 12 and along side of bevelled corners, respectively. A rake face 22 of each main cutting edge 16 is gradually inclined toward a lower surface of the tip 12 by an angle of inclination $\beta$ along the extension of the main cutting edge 16 away from its adjacent auxiliary cutting edge 18 and by a rake angle $\alpha$ ($>\beta$) along a direction perpendicular to the main cutting edge 16. The tip 12 is mounted on a cutter 9 as a rotatable cutting tool so as to discharge spiral chips during cutting. To this end, the tip 12 is mounted such that an axial rake angle, a corner angle, an angle of inclination, and a true rake angle are set in a range of $-4°$ to $-10°$, a range of $25°$ to $60°$, a range of $0°$ or larger, and a range of $-20°$ to $-5°$, respectively.

8 Claims, 15 Drawing Sheets

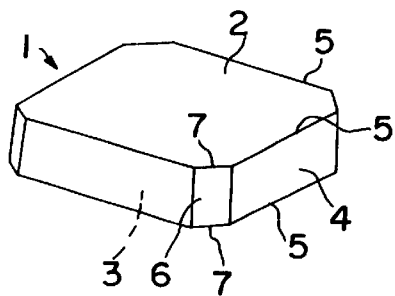
FIG. 10
PRIOR ART
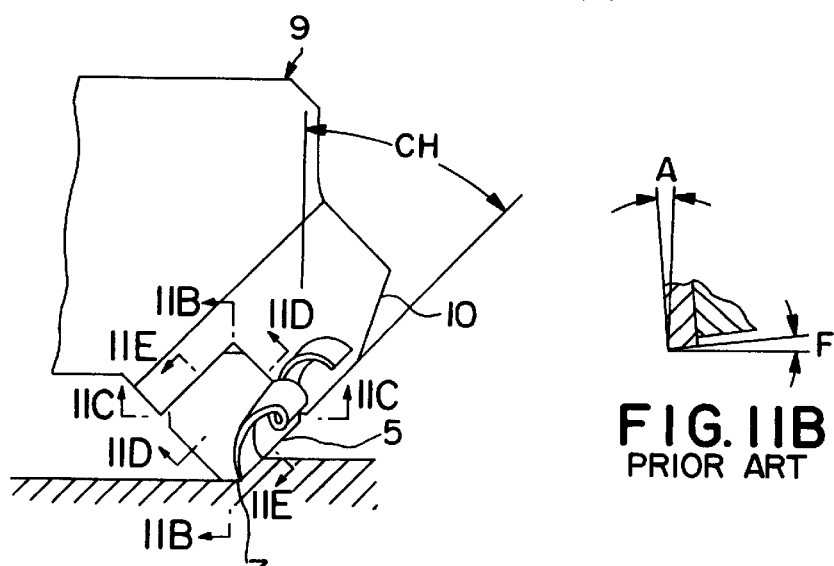
FIG. 11A
PRIOR ART
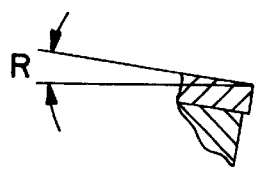
FIG. 11C
PRIOR ART
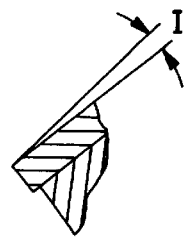
FIG. 11D
PRIOR ART
FIG. 11B
PRIOR ART
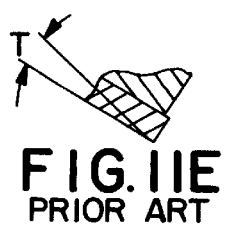
FIG. 11E
PRIOR ART

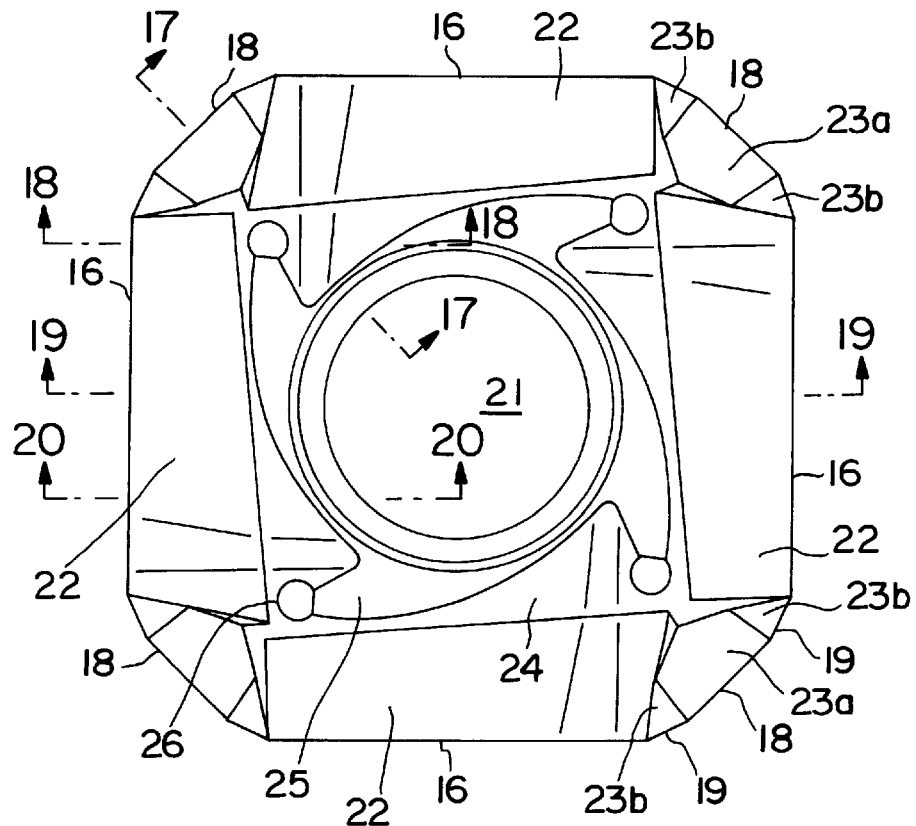
F I G. 16
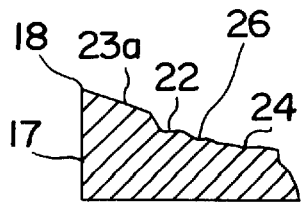
F I G. 17

THROW-AWAY TIP AND THROW-AWAY TYPE CUTTER

BACKGROUND OF THE INVENTION

1. Field of the Invention

The present invention relates to a throw-away tip which is suited to being mounted on a throw-away type cutter for cutting and a throw-away type cutter mounted with the throw-away tip.

2. Description of the Prior Art

A throw-away type cutter which suitably produces and discharges spiral chips during cutting is disclosed, for example, in Japanese Examined Patent Publication No. 48-24462. This cutter is described with reference to FIGS. 10 and 11. A throw-away tip 1 shown in FIG. 10 has a substantially rectangular shape having parallel opposite surfaces. Ridges formed by intersection of an upper surface 2 and a lower surface 3 with side surfaces 4 act as main cutting edges 5. The respective corners are cut off along the vertical direction to thereby form bevel faces 6. Ridges formed by intersection of the bevel face 6 with the upper and lower surfaces 2, 3 act as auxiliary cutting edges 7.

Since the throw-away tip 1 is of negative type, the number of effective cutting edges is twice as many as a throw-away tip of positive type.

In the case that the throw-away tip 1 is mounted on a cutter 9 of a rotatable cutting tool such as a mill as shown in FIG. 11 to perform cutting, the tip 1 is mounted at the outer side of the tip of a cutter main body 10 such that the outwardly located main cutting edge 5 forms a corner angle CH with respect to a vertical line in FIG. 11 and the auxiliary cutting edge 7 projects toward the tip of the cutter main body 10.

In such a case, in order to smoothly discharge the spiral chips without damaging the working faces, it is an essential condition to set an axial rake angle A, radial rake angle R, angle of inclination I and true rake angle T of the cutting edge within specified ranges.

According to test results, the discharge of spiral chips is confirmed to occur only when the angle of inclination I lies within a specified range of +5° or larger. It is elucidated by Kronenberg's equations (following equations (1) to (4)) that the angle of inclination I is positive when the radial rake angle R and the axial rake angle A are both negative, both positive, positive and negative, and vice versa. Based on the above, the ranges of angle which enable the discharge of spiral chips can be determined.

More specifically, the relationship of the axial rake angle A, radial rake angle R, angle of inclination I, true rake angle T and corner angle CH are defined by the following equations:

$$\tan T = \tan R \cdot \cos CH + \tan A \cdot \sin CH \quad (1)$$

$$\tan I = \tan A \cdot \cos CH - \tan R \cdot \sin CH \quad (2)$$

$$\tan A = \tan I \cdot \cos CH + \tan T \cdot \sin CH \quad (3)$$

$$\tan R = \tan T \cdot \cos CH - \tan I \cdot \sin CH \quad (4)$$

The true rake angle T as a term of these equations has a significant meaning in cutting, and is an angle which mainly influences a cutting performance. Normally, the true rake angle T is set in a range of $|0°|$ to $|20°|$.

Under the condition that a negative throw-away tip 1 having many effective cutting edges is used, it is clear according to the equation (2) that the radial rake angle R, axial rake angle A and corner angle CH which enable the discharge of spiral chips have to satisfy the following equation (5) when the angle of inclination I is a positive angle, both the axial rake angle A and the radial rake angle R are negative angles:

$$\tan A \cdot \cos CH < \tan R \cdot \sin CH \quad (5).$$

FIG. 12 shows the relationship of the true rake angle T, the angle of inclination I and the corner angle CH which is established in accordance with the following equation (6) obtained from the equations (2) and (4) when the axial rake angle A is −4°:

$$\tan I = \tan A \cdot \sec CH - \tan T \cdot \tan CH \quad (6).$$

Practical effective ranges of the angle of inclination I and the true rake angle T which enable production of spiral chips are: I>5°, T<$|20°|$, i.e. a range defined by T-I line. As is clear from FIG. 12, the true rake angle T is set in a range of −5° to −20°. FIG. 13 shows a relationship of the radial rake angle R, axial rake angle A and corner angle CH within the effective ranges of the angle of inclination I and true rake angle T. Specifically, a curve a below R=−20° represents combinations of R and CH which establish I≧5°, and a curve b thereabove represents combinations of R and CH which establish T≧−20° (i.e. a value of a negative angle becomes smaller). An area between the curves a and b is a range of settable numerical values.

Since the negative throw-away tip is used, the axial rake angle A is a clearance angle F of a front cutting edge and normally set in a range of −4° to −10°. The corner angle CH is normally set in a range of 0° to 60°. Assuming that the angle of inclination I is 5° or larger and the axial rake angle A is equal to −4°, if the corner CH in this construction is 25° or smaller, the true rake angle T is a negative angle of −20° or smaller in accordance with the equation (6) or FIG. 12. This results in a poor cutting performance, making the cutting difficult. Further, the corner angle CH can be 60° or larger, but such a large corner angle CH reduces a cut-in amount per unit size of a tip. Thus, it is generally better to set the corner angle CH at 60° or smaller.

If the negative throw-away tip 1 is shaped such that the range of the axial rake angle A is −4° to −10°, the range of the corner angle CH is 25° to 60°, the range of the angle of inclination I is +5° or larger when the tip 1 is secured to the cutter 9, spiral chips can be discharged despite the fact that the axial rake angle A and the radial rake angle R are both negative.

However, since the throw-away tip 1 is of negative type having a flat shape and parallel opposite surfaces, both the axial rake angle A and the true rake angle T need to be negative when the tip 1 is mounted on the cutter 9 for cutting. Thus, a chip discharging ability and a cutting performance are not necessarily sufficient.

In view of the above problem, it is an object of the present invention to provide a throw-away tip having improved chip discharging ability and cutting performances.

It is another object of the invention to provide a throw-away tip, providing balance of the cutting performance and a tip strength.

It is further object of the invention to provide a throw-away type cutter a chip discharging ability and a cutting performances of which can be improved by mounting the throw-away tip thereon.

SUMMARY OF THE INVENTION

A negative throw-away tip according to the invention has a substantially polygonal shape and comprises main and auxiliary cutting edges formed along ridges formed by intersection of an upper surface opposite to a lower surface as a seating surface with side surfaces. Each main cutting edge is gradually inclined toward the lower surface along its extension away from one of its adjacent auxiliary cutting edge, and then curved upward to be connected with the other of its adjacent auxiliary cutting edge. A rake face of each main cutting edge is gradually inclined toward the lower surface along the extension of the main cutting edge away from the one auxiliary cutting edge.

A rake face of each auxiliary cutting edge may be preferably gradually inclined toward the lower surface along a direction perpendicular to the auxiliary cutting edge.

Preferably, an inner area continuous with the rake faces is formed by a slanted flat face which is inclined in the same direction as the main cutting edges.

A plurality of auxiliary cutting edges formed on the same surface may be preferably located on the same horizontal plane.

In a preferred negative throw-away tip according to the invention, main cutting edges and auxiliary cutting edges are formed at least along ridges formed by intersection of an upper surface opposite to a lower surface as a seating surface with side surfaces, wherein each main cutting edge is gradually inclined toward the lower surface as it extends more away from the one adjacent auxiliary cutting edge, and a rake face of each main cutting edge is gradually inclined toward the lower surface along a direction perpendicular to the main cutting edge or formed into a twisted face that is inclined toward the lower surface so that a rake angle is gradually changed along the main cutting edge.

The rake angle of each main cutting edge may gradually become larger in a direction along the extension of the main cutting edge away from the corresponding auxiliary cutting edge.

The rake angle of each main cutting edge may gradually become smaller in the direction along the extension of the main cutting edge away from the corresponding auxiliary cutting edge.

The rake face of each main cutting edge may be preferably formed such that its width along a direction perpendicular to the main cutting edge is relatively small in an area where the rake angle is large, while it is relatively large in an area where the rake angle is small, or the rake faces of the main cutting edges may each have a substantially fixed width over their entire lengths.

Each main cutting edge may be preferably formed such that its angle of inclination is fixed or gradually changes.

In a preferred throw-away tip according to the invention, main cutting edges and auxiliary cutting edges are formed along ridges formed by intersection of opposite upper and lower surfaces with side surfaces, wherein each main cutting edge is gradually inclined toward the opposite lower or upper surface in a direction away from the one adjacent or corresponding auxiliary cutting edge, a rake face of each main cutting edge is gradually inclined toward the lower or upper surface in a direction perpendicular to the cutting edge, and a flat seating surface having a height lower than the main cutting edges is formed inward of the main cutting edges via breaker grooves.

The breaker grooves may preferably be formed such that their width gradually widens along the main cutting edges from the corresponding auxiliary cutting edges.

Each breaker groove may preferably comprise a first slanted face which is sloped upward inward of the rake face of the corresponding main cutting edge, and a second slanted face which is sloped more moderately upward than the first slanted face and is formed in a wide area of the breaker groove.

The lower surface may preferably have the same configuration as the upper surface.

The throw-away tip is of negative type, and opposite upper and lower surfaces can be so configured as to be identical and rotationally symmetrical with respect to a vertical direction.

The seating surface is preferably contiguous with rake faces of the auxiliary cutting edges each having a positive rake angle.

Further, the throw-away tip has preferably a substantially square shape.

A center area continuous with the rake face of each main cutting edge may be formed into a slanted flat face which is inclined in the same direction as the main cutting edge.

If $\alpha$ and $\beta$ denote a rake angle of the rake face of the main cutting edge and an angle of its inclination along the extension of the cutting edge, respectively, there is preferably established a relationship: $\alpha > \beta$.

In a throw-away type cutter according to the invention, the throw-away tip according to the invention may be mounted such that an axial rake angle, a corner angle and an angle of inclination are preferably set in a range of $-4°$ or smaller, a range of $25°$ to $60°$ and a range of $0°$ or larger, respectively to produce and discharge spiral chips during cutting.

In a preferred throw-away type cutter mounted with the throw-away tip according to the invention such that an axial rake angle, a corner angle and an angle of inclination are set in a range of $-4°$ or smaller, a range of $25°$ to $60°$ and a range of $0°$ or larger, respectively to produce and discharge spiral chips during cutting, the throw-away tip is preferably mounted on a tip mount seat via a seat having an upper surface having a configuration corresponding to that of the seating surface of the throw-away tip.

The axial rake angle is preferably set in a range of $-4°$ to $-10°$, more preferably in a range of $-5°$ to $-7°$.

The true rake angle is preferably set in a range of $-20°$ to $-5°$, more preferably in a range of $-15°$ to $-10°$.

The throw-away tip may be mounted on the cutter so as to satisfy the equation:

$$\tan I = \tan A \cdot \sec CH - \tan T \cdot \tan CH.$$

According to the inventive throw-away type cutter, spiral chips can be produced and discharged. Production and discharge of the spiral chips are realizable even when the axial rake angel and the radial rake angle are both negative. As compared with the case where the throw-away tip having a flat shape and parallel opposite surfaces is mounted, the actual angle of inclination and true rake angle can be both increased in a positive direction, e.g. can both take a positive value, with the result that the chip discharging ability and cutting performance are improved and the tip can be stably seated.

BRIEF DESCRIPTION OF THE DRAWINGS

FIG. 10 is a perspective view of a prior art throw-away tip.

FIG. 11 is a diagram showing an essential portion of a cutter mounted with the prior art throw-away tip of FIG. 10.

FIG. 16 is a plan view of the throw-away tip of FIG. 14.

FIG. 17 is a section along line V—V of FIG. 16.

DETAILED DESCRIPTION OF THE PREFERRED EMBODIMENTS

Hereafter, a first embodiment of the invention is described with reference to FIGS. 1 to 8.

Figure 1:
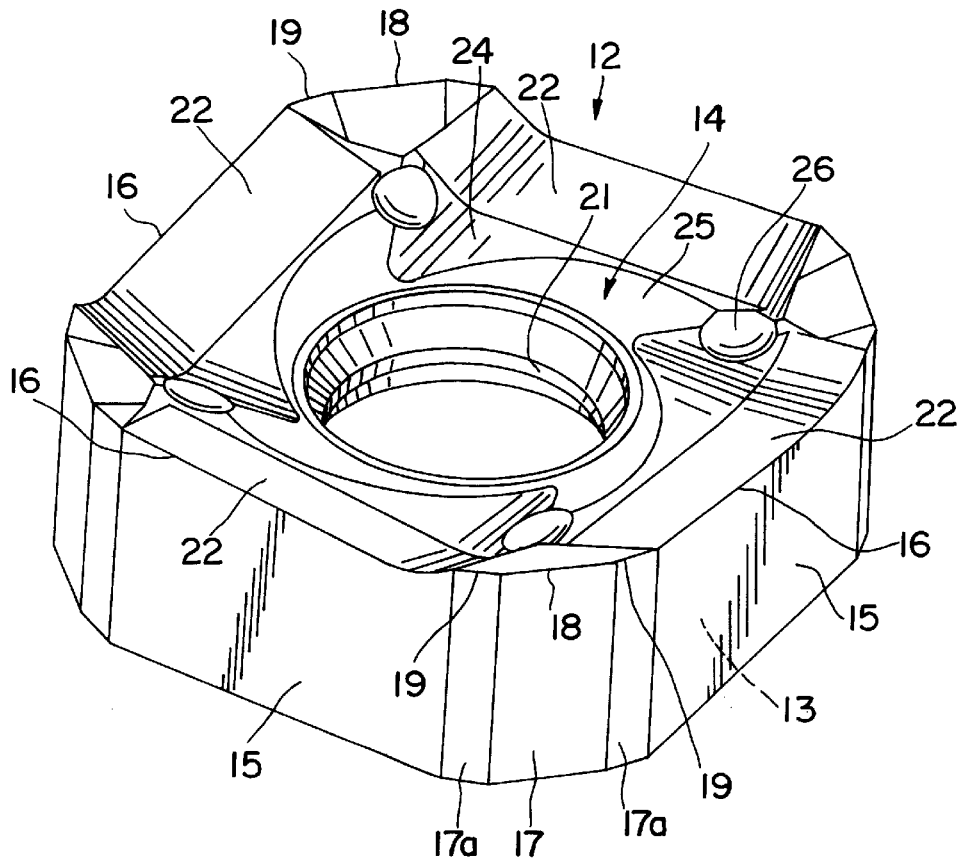
FIG. 1 is a perspective view of a throw-away tip according to a first embodiment of the invention.
Figure 2:
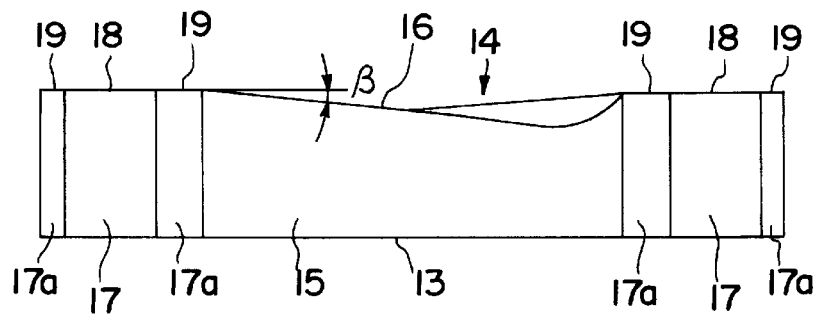
FIG. 2 is a front view of the throw-away tip of FIG. 1.
Figure 3:
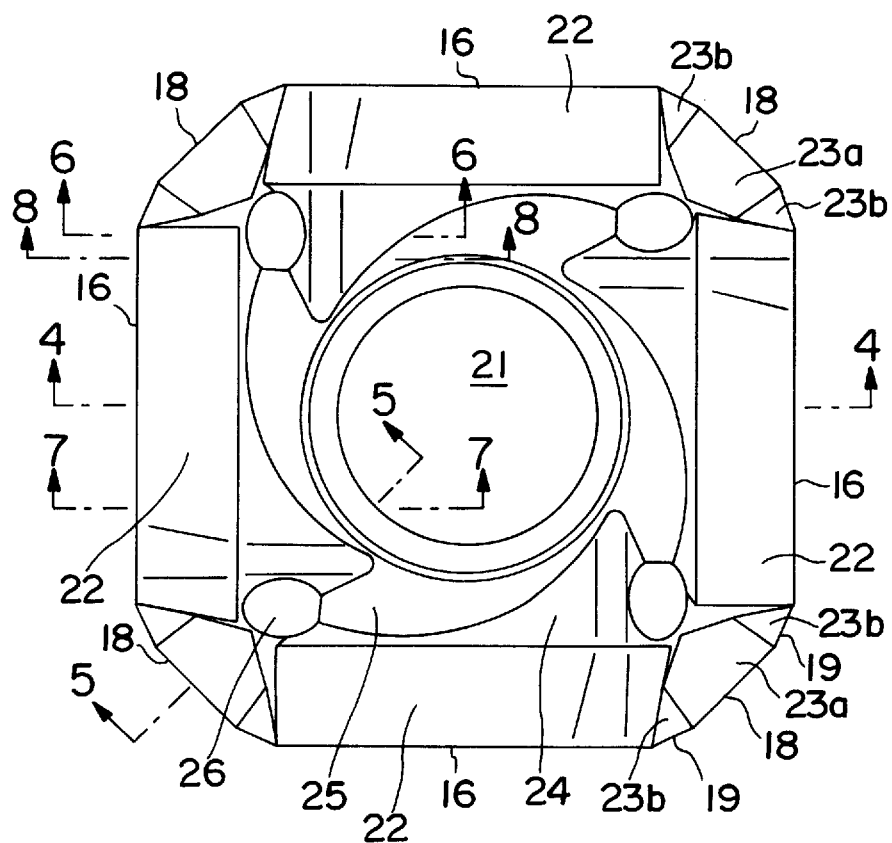
FIG. 3 is a plan view of the throw-away tip of FIG. 1.

FIGS. 1, 2 and 3 are a perspective view, a front view and a plan view of a throw-away tip according to the embodiment of the invention, respectively. FIGS. 4 to 8 are sections along line V—V, line W—W, line X—X, line Y—Y and line Z—Z of FIG. 3, respectively.

A throw-away tip 12 shown in FIGS. 1 and 2 has a substantially square shape. A lower surface 13 as a seating surface is flat. Ridges formed by intersection of an upper surface 14 opposite to the lower surface 13 with side surfaces 15 between the lower and upper surfaces 13 and 14 act as main cutting edges 16. Ridges formed by intersection of the upper surface 14 with bevel faces 17 are formed by cutting off the respective corners along the vertical direction and act as auxiliary cutting edges 18. The side surfaces 15 and the bevel faces 17 are at a right angle to the lower surface 13. The throw-away tip 12 is of negative type.

The auxiliary cutting edges 18 formed at the respective corners of the upper surface 14 are located on an imaginary horizontal plane parallel to the lower surface 13, i.e. located at the same height. The corners between each bevel face 17 and the side surfaces 15 on its opposite sides are cut off to form a flat bevel face 17a. Ridges formed by intersection of the bevel faces 17a and the upper surface 14 act as cutting edges 19.

The bevel faces 17a and the cutting edges 19 may not be necessary, but it is preferable to form them at least between the auxiliary cutting edges 18 and the main cutting edges 16 in order to prevent a cracking. Further, the bevel faces 17 may be R-shaped curved faces.

Each main cutting edge 16 is formed by a slanted ridge which is gradually inclined toward the lower surface 13 along the extension of each respective main cutting edge 16 away from one adjacent auxiliary cutting edge 18, and each main cutting edge 16 is curved upwardly in the vicinity of the other adjacent auxiliary cutting edge 18 to be connected therewith.

In the middle of the tip 12, there is formed a through hole 21 for a clamping screw.

Figure 4:
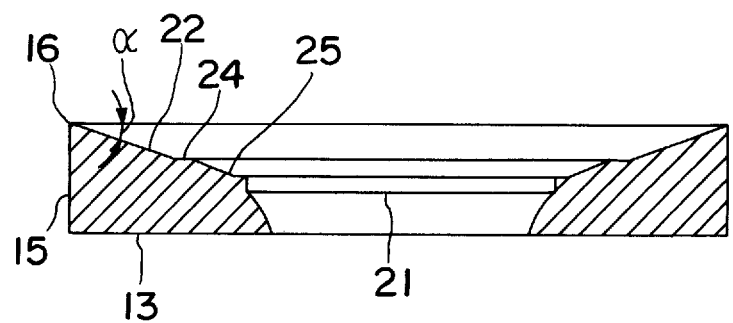
FIG. 4 is a section along line V—V of FIG. 3.
Figure 5:
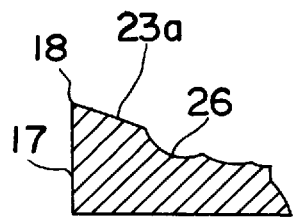
FIG. 5 is a section along line W—W of FIG. 3.

In the upper surface 14, a rake face 22 of each main cutting edge 16 is formed to have a substantially fixed width along the length of the main cutting edge 16. The rake face 22 is gradually inclined toward the lower surface 13, such that the distance between the rake face 22 and the lower surface 13 gets shorter along the extension of the main cutting edge 16 away from one adjacent auxiliary cutting edge 18 angle of inclination, $\beta$, as shown in FIG. 2. The rake face 22 also is gradually inclined toward the through-hole 21 at the center of the throw-away tip 12 and away from the main cutting edge 16 to define a rake angle, $\alpha$, as shown in FIG. 4. Each rake face 22 is a flat face along a major portion of its length, and is curved and inclined steeply upwardly in the vicinity of the other adjacent auxiliary cutting edge 18 to be connected therewith.

In this case, the strength of the tip 12 depends upon the lengths of the rake faces 22 in directions determined by the rake angle $\alpha$ and the angle of inclination $\beta$. The length along the direction of the angle of inclination $\beta$ is longer than the length along the direction of the rake angle $\alpha$. Accordingly, the angles $\alpha$ and $\beta$ are set such that $\alpha>\beta$ to ensure a sufficient tip strength. Further, the rake angle $\alpha$ is set between 10° and 30°, and preferably between 15° and 25°. If $\alpha$ is smaller than 10°, cutting performance is reduced. On the contrary, if $\alpha$ is larger than 30°, a tip angle becomes too small, with the result that a cracking is likely to occur. Further, the angle of inclination $\beta$ is set between 5° and 20°, and preferably between 10° and 15°. Chip discharging performance is reduced if $\beta$ is smaller than 5°, whereas tip strength is reduced if $\beta$ is larger than 20°.

Rake faces 23a, 23b of the auxiliary cutting edge 18 and the cutting edge 19 are gradually inclined such that distances between the lower surface 13 and the rake faces 23a, 23b get smaller at locations closer to the through hole 21 of the throw-away tip 12 and away from the corresponding cutting edges 18 and 19.

Figure 6:
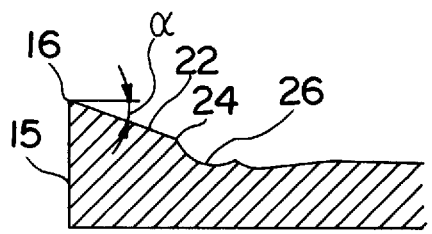
FIG. 6 is a section along line X—X of FIG. 3.
Figure 7:
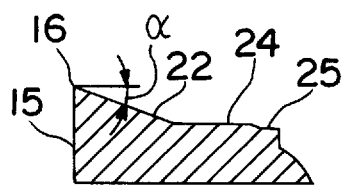
FIG. 7 is a section along line Y—Y of FIG. 3.
Figure 8:
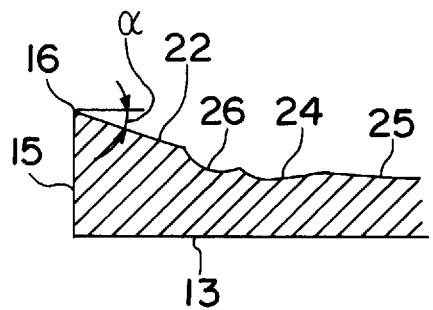
FIG. 8 is a section along line Z—Z of FIG. 3.

A slanted flat face 24 is formed between the rake face 22 of each cutting edge 16 and the through hole 21. The slanted flat face 24 which is inclined in parallel with the main cutting edge 16 and is horizontal in a direction perpendicular to the main cutting edge 16 as shown in FIGS. 6, 7 and 8. Each slanted flat face 24 is continuous with the corresponding rake face 22. Further, an area between the respective slanted flat faces 24 and the through hole 21 is cut out to form a tapered slanted face 25 which is concentric with the through hole 21.

Recesses 26 are formed inward of the corresponding rake faces 23a, 23b of the cutting edges 18, 19.

By constructing as above, a three-dimensional breaker is formed in the rake face 22 of each main cutting edge 16.

As described above, because of the presence of the rake faces 22 of the main cutting edges 16, the throw-away tip 12 according to the foregoing embodiment has an improved cutting performance due to the rake angle increased by α and an improved chip discharging ability due to the angle of inclination increased by β. Since α>β in the rake faces 22, the rake faces 22 are inclined to a smaller extent along the directions determined by the angle of inclination β, with the result that the strength of the tip can be ensured. Further, the slanted flat faces 24 formed inward of the rake faces 22 ensure the thickness of the tip when the tip makes a deep cut and, accordingly, the strength of the tip. Furthermore, being of negative type, the tip 12 can be easily molded by pressing, thereby advantageously ensuring the strength of the tip.

Figure 9:
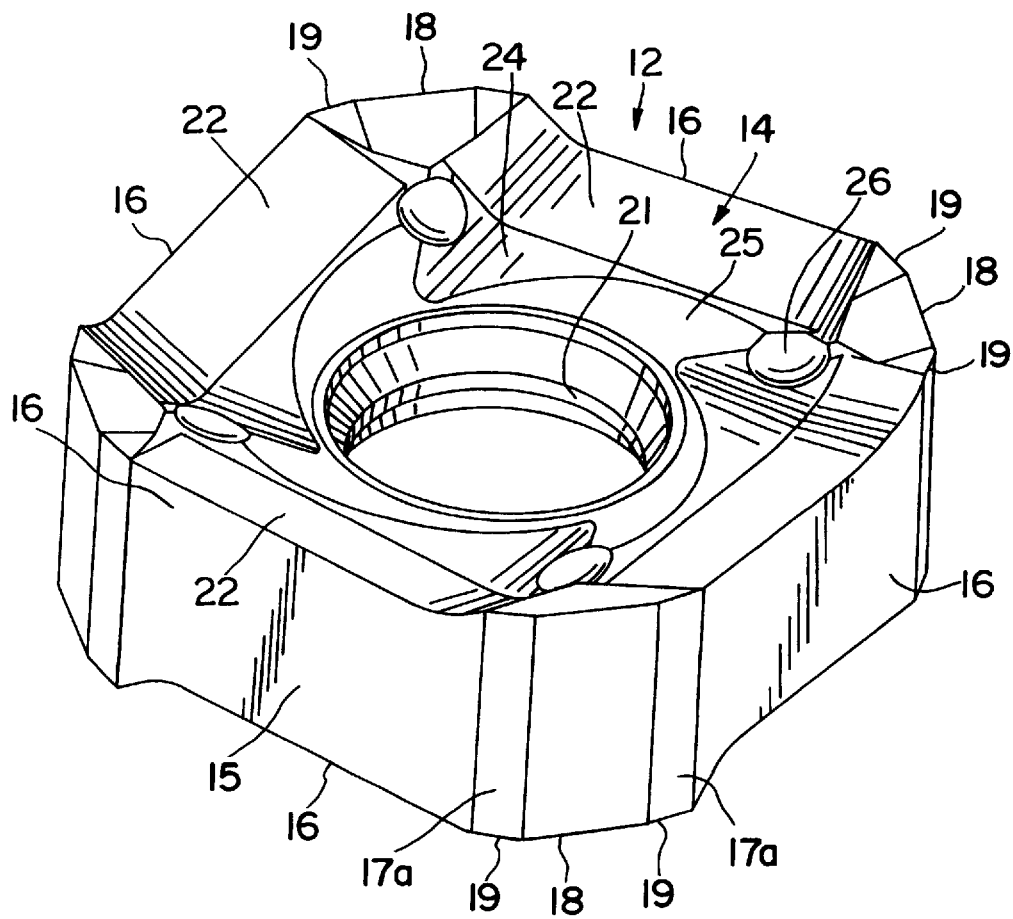
FIG. 9 is a perspective view of a throw-away tip according to a second embodiment of the invention.
Figure 12:
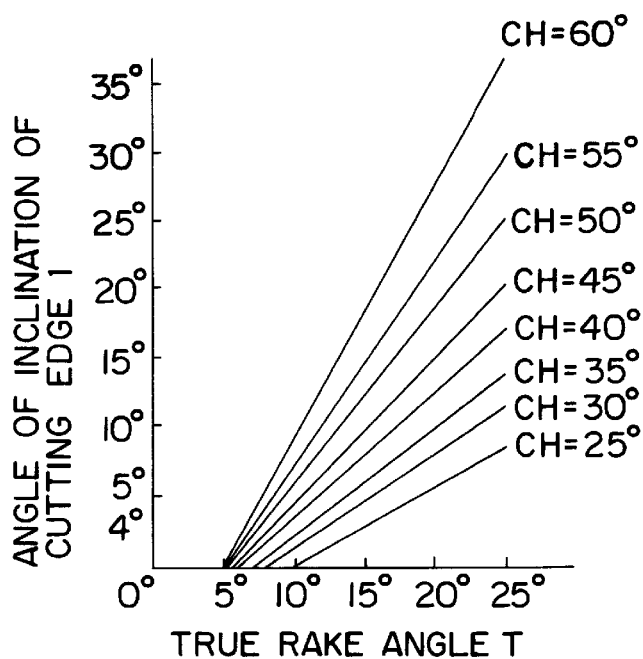
FIG. 12 is a graph showing a relationship of an angle of inclination, a true rake angle and a corner angle of the prior art throw-away tip.

Although the cutting edges 16, 18 and the like are formed only on the upper surface 14 in the foregoing embodiment, the invention may embrace a throw-away tip 12 as shown in a perspective view of FIG. 9 in which lower and upper surfaces 13 and 14 have an identical construction, i.e. are formed with the main cutting edges 16, rake faces 22, auxiliary cutting edges 18, etc. In this case, the number of effective cutting edges doubles that of the foregoing embodiment. In the throw-away tip 12, the corresponding main cutting edges 16 of the upper and lower surfaces 14, 13 are formed parallel to each other so that a distance therebetween is substantially same in any arbitrary position.

The throw-away tip 12 having the main cutting edges 16 and the auxiliary cutting edges 18 formed both on the upper and lower surfaces 14 and 13 has an advantage that precision of dimensions are easily manageable since the plurality of auxiliary cutting edges 18 on each surface are located on the same imaginary plane.

According to the throw-away tip of the first and second embodiment, the rake faces of the main cutting edges are gradually inclined toward the lower surface along the extension of the main cutting edges away from the auxiliary cutting edge. The rake angle takes a positive value in the axial direction, thereby improving chip discharging ability. Further, the rake faces of the main cutting edges are inclined toward the lower surface along the direction perpendicular to the main cutting edge. This makes the rake angle larger, thereby improving cutting performance. Further, since the tip is of negative type, the cutting edges have a high strength.

The cutting performance further improves since the rake faces of the auxiliary cutting edges are gradually inclined toward the lower surface along the direction perpendicular to the auxiliary cutting edges.

Since the rake faces of the main cutting edge each have a substantially fixed width over their entire lengths, and the inner area continuous with the rake faces is formed by the slanted flat face, a sufficient thickness of the throw-away tip can be ensured when it makes a deep cut and, accordingly, the strength thereof can be ensured.

Further, in comparison with a throw-away tip of positive type, the throw-away tip of negative type has twice as many effective cutting edges and can be easily molded by pressing.

Further, since the auxiliary cutting edges are formed on the same horizontal plane, precision of dimensions can be easily managed.

Since the relationship α>β is established for the rake faces of the main cutting edges, the strength of the tip can be ensured because the inclination of these rake faces along its relatively longer dimension determined by the angle β is small.

Hereafter, a third and fourth embodiment of the invention is described with reference to FIGS. 14 to 22.

Figure 14:
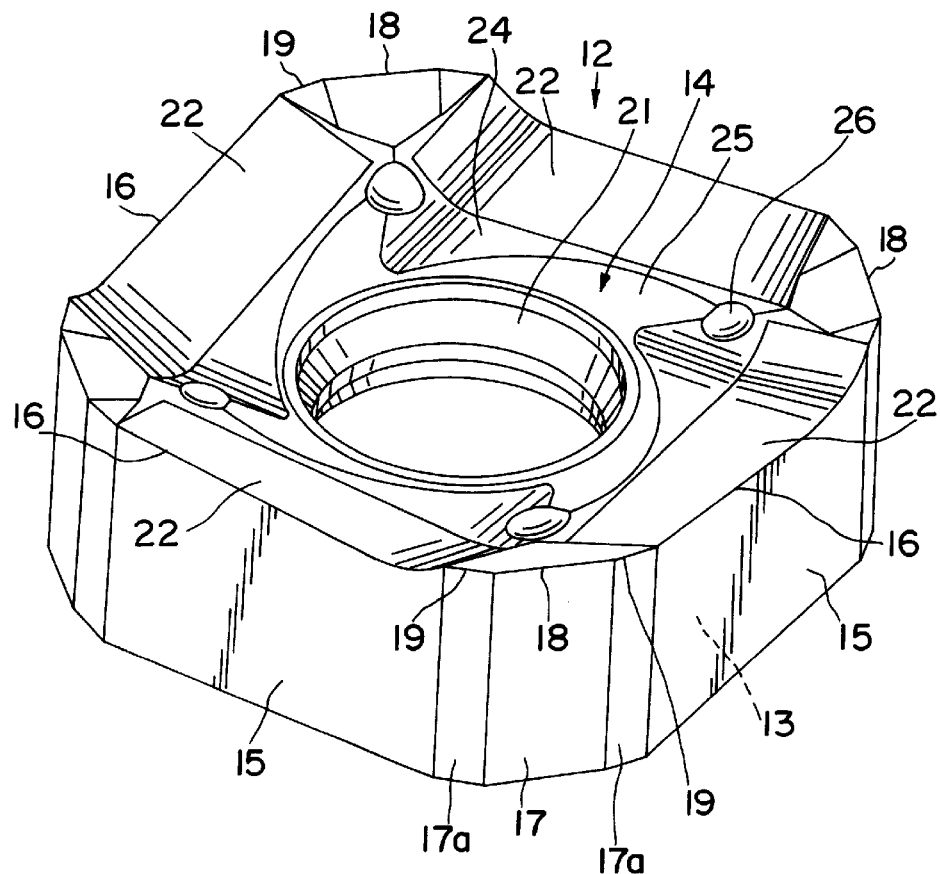
FIG. 14 is a perspective view of a throw-away tip according to a third embodiment of the invention.
Figure 15:
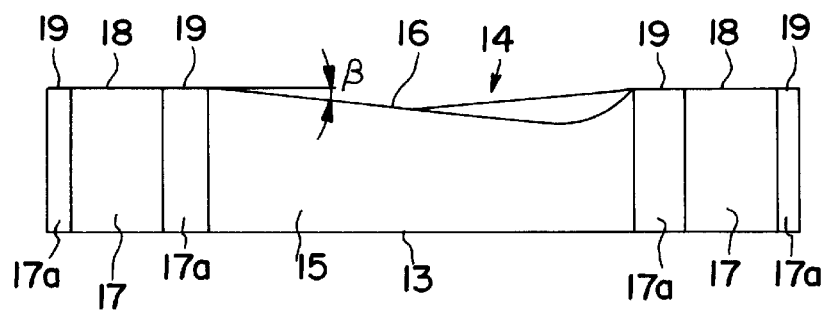
FIG. 15 is a front view of the throw-away tip of FIG. 14.

FIGS. 14, 15 and 16 are a perspective view, a front view and a plan view of a throw-away tip according to the third embodiment of the invention, respectively. FIGS. 17 to 20 are sections along line V—V, line X—X, line Y—Y and line Z—Z of FIG. 16, respectively.

The basic construction of the throw-away tip 12 shown in FIGS. 14 and 15 is substantially similar to the one described in the first embodiment.

In the upper surface 14, as shown in FIG. 16, a rake face 22 of each main cutting edge 16 is formed such that its width gradually widens in a direction along the extension of the main cutting edge 16 away from one adjacent auxiliary cutting edge 18 toward the other adjacent auxiliary cutting edge 18. The rake face 22 is gradually inclined toward the lower surface 13, such that the distance between the rake face 22 and the lower surface 13 becomes shorter along the extension of the main cutting edge 16 away from the one adjacent auxiliary cutting edge 18. The distance between the rake face 22 and the lower surface 13 also becomes shorter of the throw-away tip 12 and along a direction toward the through-hole 21 perpendicular to the main cutting edge 16 to define a rake angle α.

Figure 18:
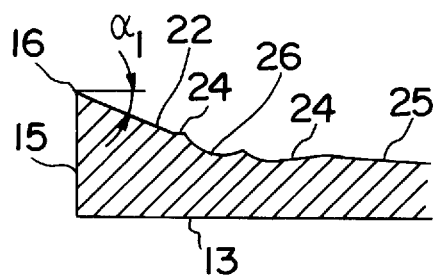
FIG. 18 is a section along line X—X of FIG. 16.
Figure 19:
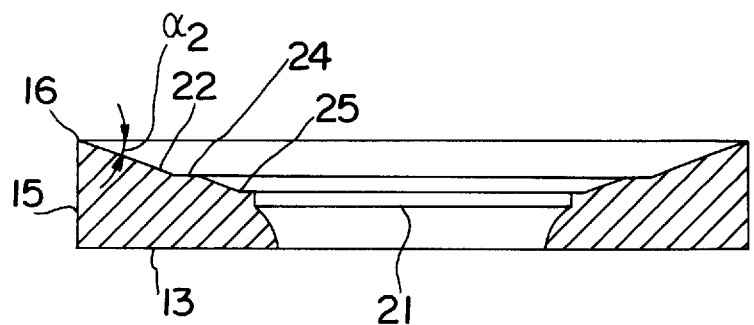
FIG. 19 is a section along line Y—Y of FIG. 16.
Figure 20:
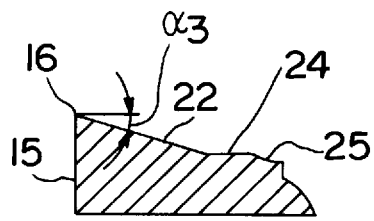
FIG. 20 is a section along line Z—Z of FIG. 16.

The rake angle α is largest at the one adjacent auxiliary cutting edge 18, and becomes gradually smaller ($\alpha_1 > \alpha_2 > \alpha_3$) as shown in sections of FIGS. 18 to 20. Accordingly, the rake face 22 forms a twisted slanted face.

The rake face 22 is curved steeply upwardly in the vicinity of the other adjacent auxiliary cutting edge 18. The steeply curved portion of the rake face 22 is contiguous with a rake face 23a of the other adjacent auxiliary cutting edge 18 and also is contiguous with a rake face 23b of the cutting edge 19).

The variable range of the rake angle α is set between 0° to 30° (preferably between 10° and 25°). In this case, if α is smaller than 0°, the cutting performance is reduced. On the other hand, if α is larger than 30°, the tip angles become small, thereby making the tip more subject to cracking. Further, the range of the angle of inclination β is set between 5° and 20° (preferably between 10° and 15°). The chip discharging ability is reduced if β is smaller than 5°, while the tip strength is reduced if β is larger than 20°.

Further features of the first and second embodiments are substantially applicable to the third and fourth embodiments. specifically reference is given regarding the rake faces, slanted faces, rake angel and the like.

As described above, in the throw-away tip 12, the rake face 22 is formed into a twisted face that the rake angle α becomes smaller ($\alpha_1 > \alpha_2 > \alpha_3$) and its width gradually widens along the extension of the main cutting edge 16 away from the auxiliary cutting edge 18. Accordingly, in the case of a shallow cut, the cutting performance is good and chips are easy to be curled because of a small breaker width. In the case of a deep cut, since the strength of the tip used for cutting is high and the breaker width is large, chips are smoothly discharged, thereby preventing an occurrence of clogging. The tip 12 is particularly suitable for cutting steel or like material having a relatively high hardness.

Figure 21:
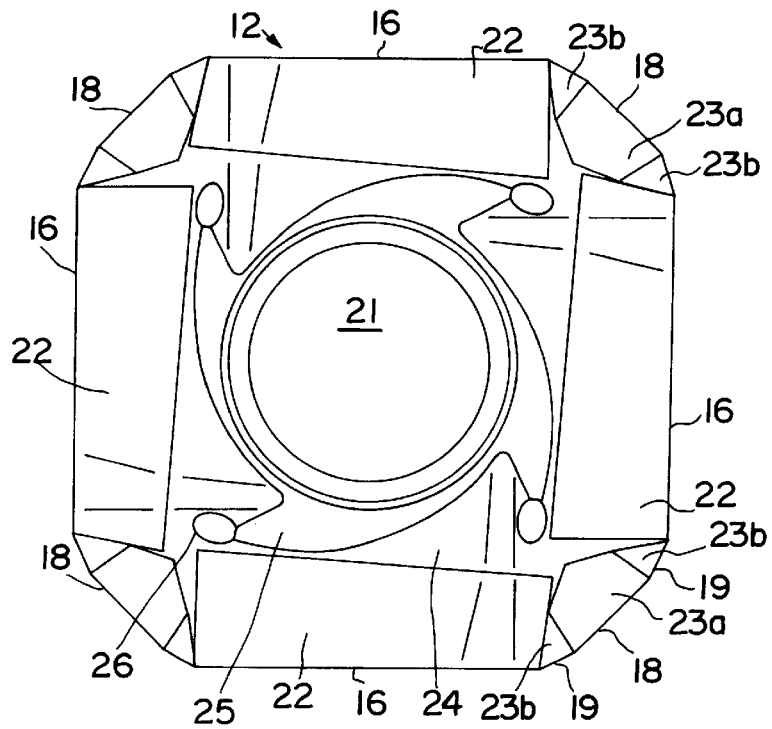
FIG. 21 is a plan view, similar to FIG. 16, of a modification of the throw-away tip shown in FIGS. 1 to 9 and 14 to 20.
Figure 22:
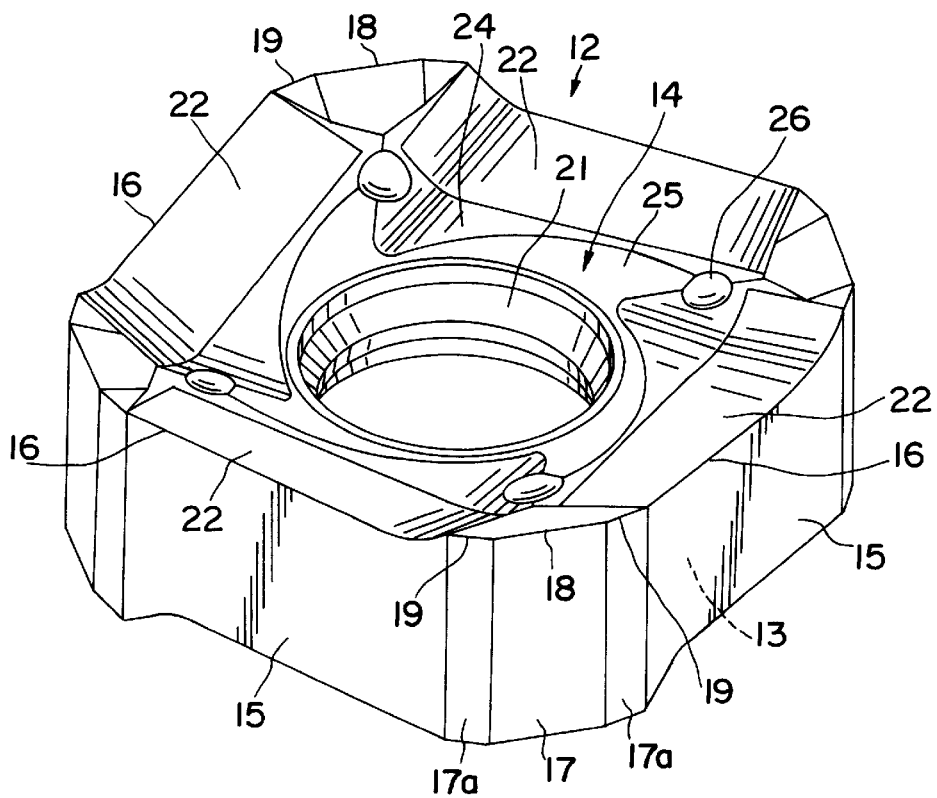
FIG. 22 is a perspective view of a throw-away tip according to a fourth embodiment of the invention.

The rake face 22 in the form of a twisted face is formed such that the rake angle α becomes gradually smaller in the direction along the main cutting edge 16 away from the one adjacent auxiliary cutting edge 18 in the foregoing embodiment. As a modification, the rake face 22 may be formed such that the rake angle α becomes gradually larger in the direction along the main cutting edge 16 away from the one adjacent auxiliary cutting edge 18. In this case, as shown in FIG. 21, the width of a rake face 22 of a throw-away tip 12 becomes gradually narrower in a direction away from the one adjacent auxiliary cutting edge 18.

With such a configuration, when a material to be cut is a relatively soft material such as aluminum, the cutting performance when the tip makes a deep cut can be improved. As a result, chips can be satisfactorily curled and discharged without adversely affecting the tip strength.

A fourth embodiment of the invention is substantially an analogous modification of the third embodiment as it is the second of the first, i.e. lower and upper surfaces 13 and 14 have an identical construction.

The third and fourth embodiments present similar advantages as the first and second embodiment, substantially for the same reasons. Therefore reference is given to the foregoing description of the first and second embodiments.

Further, although the angle of inclination β is fixed so as to linearly incline the main cutting edges 16 in the foregoing embodiments, it may gradually changes along the length of the main cutting edges 16 so that the main cutting edges 16 are gradually inclined toward the lower surface along their extension away from the corresponding auxiliary cutting edges 18. For example, by changing the angle of inclination β, the main cutting edges 16 may form a concave or convex curve and be gradually inclined toward the lower surface along their extension away from the corresponding auxiliary cutting edges 18.

In this way, degrees of tip strength and chip discharging ability can be suitably adjusted.

According to the throw-away tip of the third and fourth embodiment, each main cutting edge is inclined toward the lower surface in the direction away from the corresponding auxiliary cutting edge, and the rake face thereof is formed into a twisted face so that its rake angle changes along the main cutting edge. Accordingly, the main cutting edge demonstrates a good cutting performance in the area where the rake angle is large. On the other hand, in the area where the rake angle is small, the strength of the tip is improved although the cutting performance thereof is relatively reduced. By changing the rake angle of the rake face along the main cutting edge depending upon the hardness of steel, aluminum or like material to be cut and a required cutting characteristic, the cutting performance and the tip strength can be suitably balanced according to the hardness of the material to be cut and a depth of cut. As a result, there can be obtained a cutting characteristic suitable for the use of the tip. Further, since the tip is of negative type, the tip has a high strength.

By making the rake angle of each main cutting edge gradually larger in the direction away from the corresponding auxiliary cutting edge, the cutting performance when the tip makes a deep cut can be improved.

Further, by making the rake angle of each main cutting edge gradually smaller in the direction away from the corresponding auxiliary cutting edge, the cutting performance when the tip makes a shallow cut can be improved.

Since the rake face of each main cutting edge is narrow in the area where the rake angle is large, chips are likely to be curled in this area. Further, since the rake face of each main cutting edge is wide in the area where the rake angle is small, chips are smoothly discharged, thereby preventing clogging of chips.

If the angle of inclination of each main cutting edge is fixed, the main cutting edge is linearly inclined. On the other hand, if it gradually changes, the main cutting edge forms, for example, a concave or convex curve. Accordingly, the tip strength and chip discharging ability can be set according to the angle of inclination and, thus, can be adjusted according to the depth of cut.

Since the rake face of each auxiliary cutting edge is so formed as to be inclined toward the lower surface in the direction perpendicular to the auxiliary cutting edge, the cutting performance can be improved.

Further, the slanted flat faces formed in the center area ensure a sufficient thickness of the throw-away tip when a deep cut is made, thereby maintaining the strength of the tip.

Further, since the auxiliary cutting edges are located on the same plane, precision of dimensions can be easily managed.

Hereafter, a fifth embodiment of the invention is described with reference to FIGS. 23 to 29.

Figure 23:
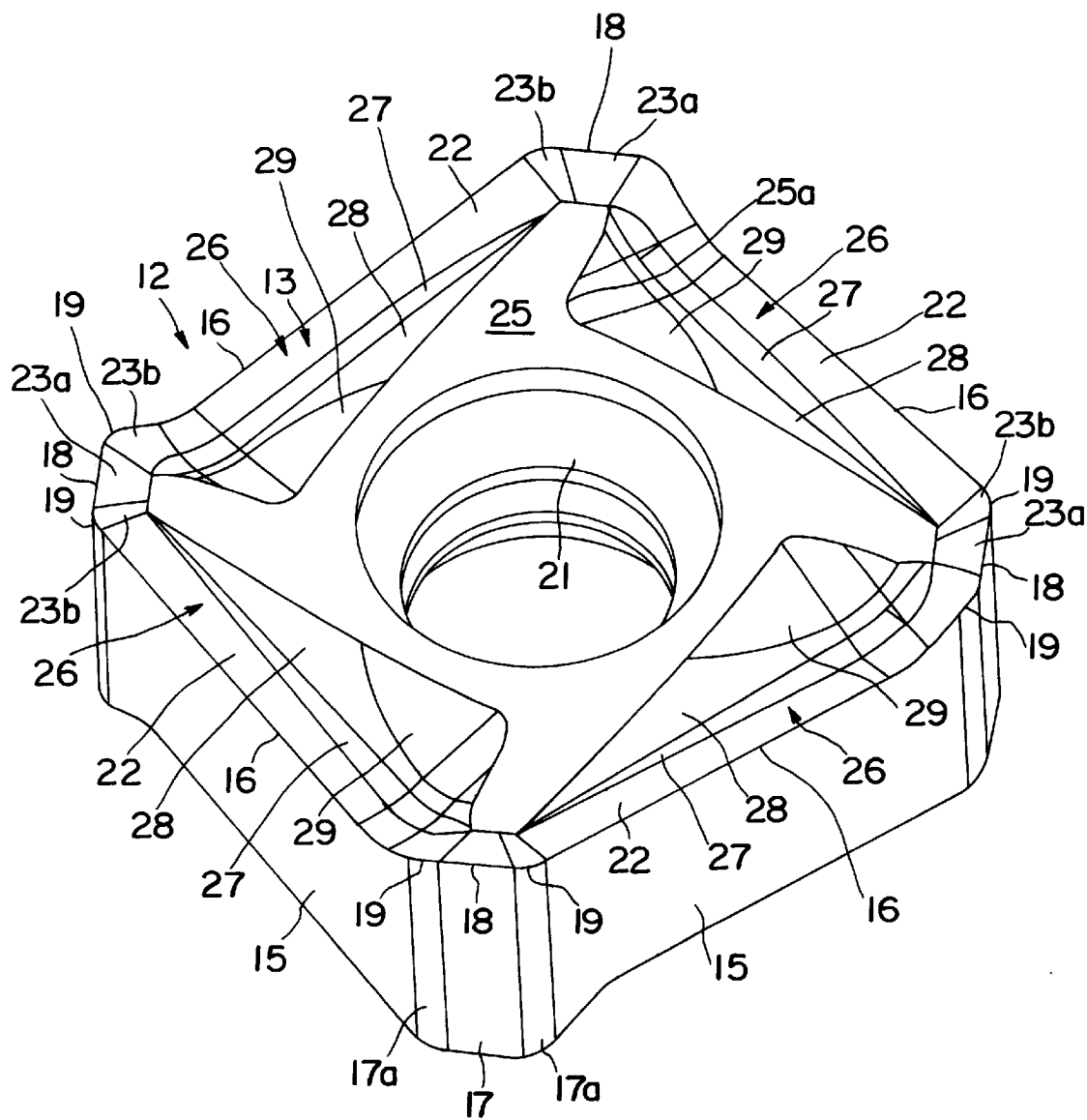
FIG. 23 is a perspective view of a throw-away tip according to a fifth embodiment of the invention.
Figure 24:
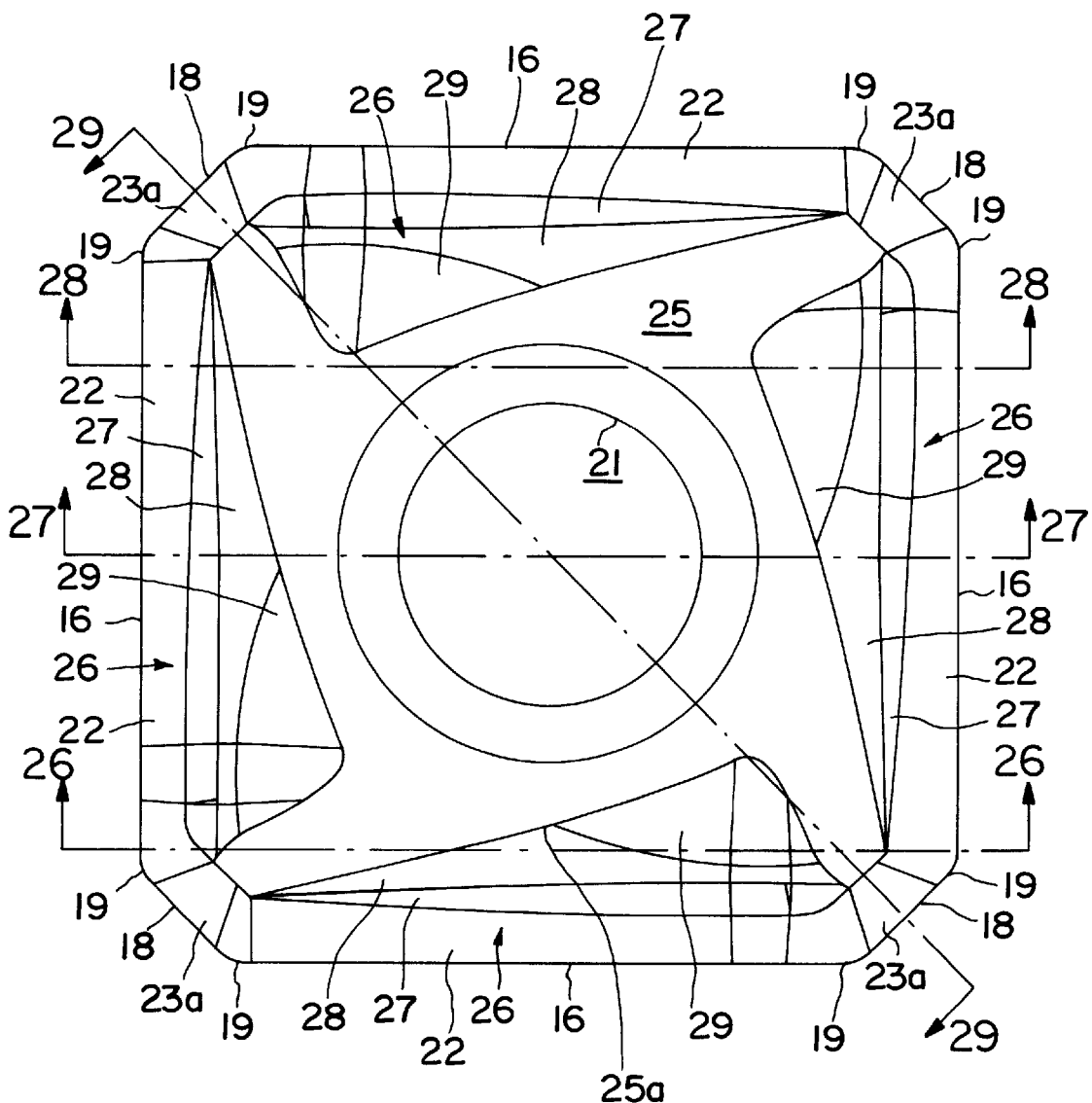
FIG. 24 is a plan view of the throw-away tip of FIG. 23.
Figure 25:
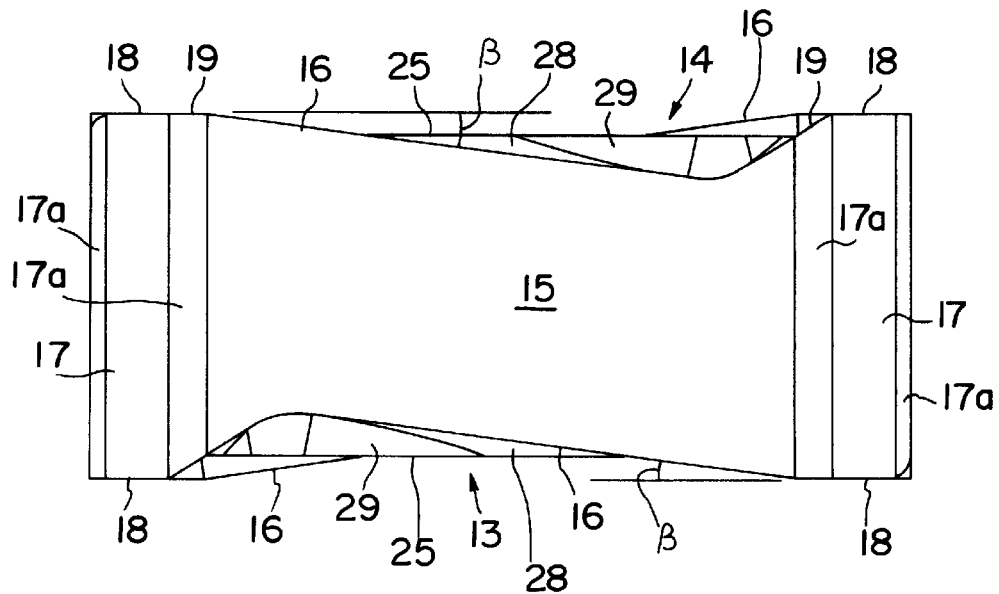
FIG. 25 is a front view of the throw-away tip of FIG. 23.
Figure 26:
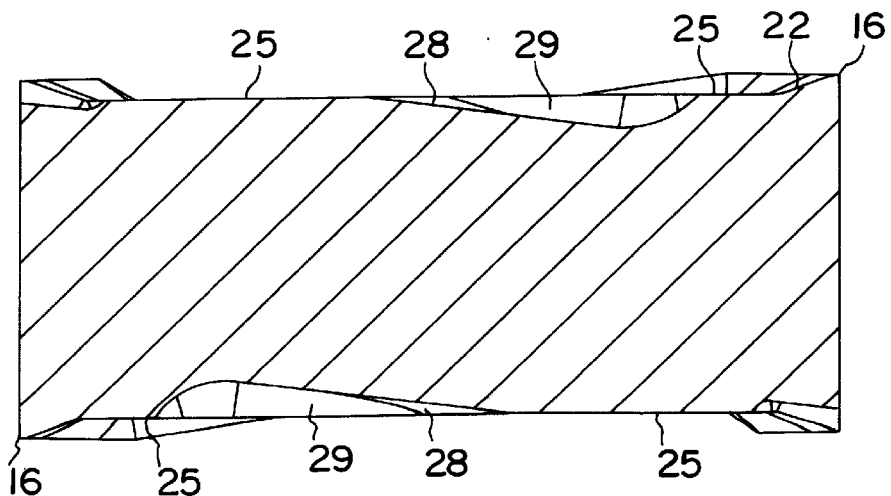
FIG. 26 is a section along line E—E of FIG. 24.
Figure 27:
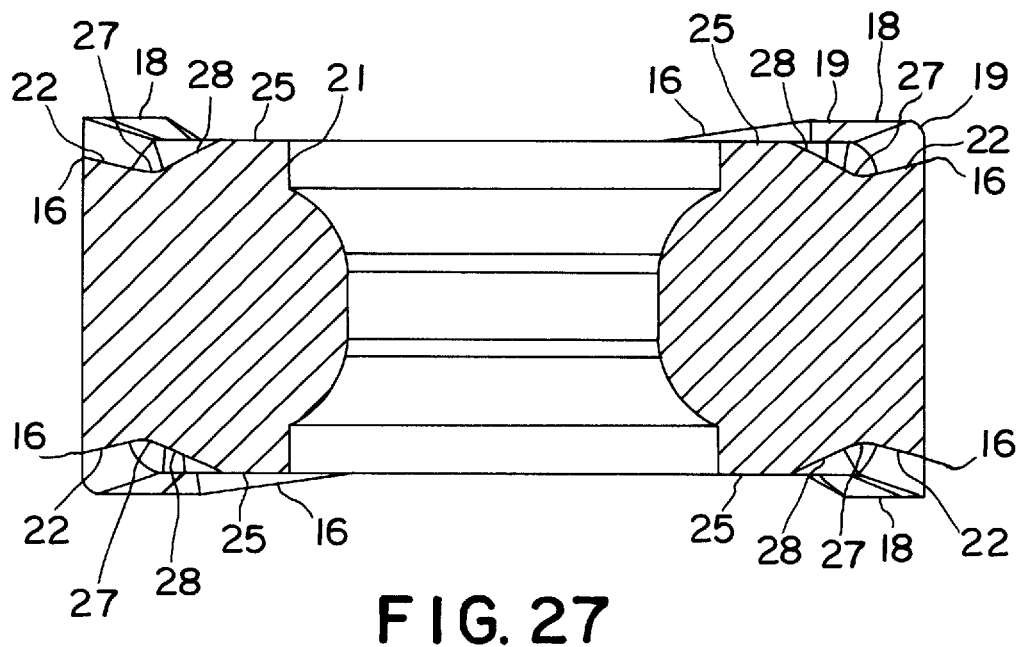
FIG. 27 is a section along line F—F of FIG. 24.
Figure 28:
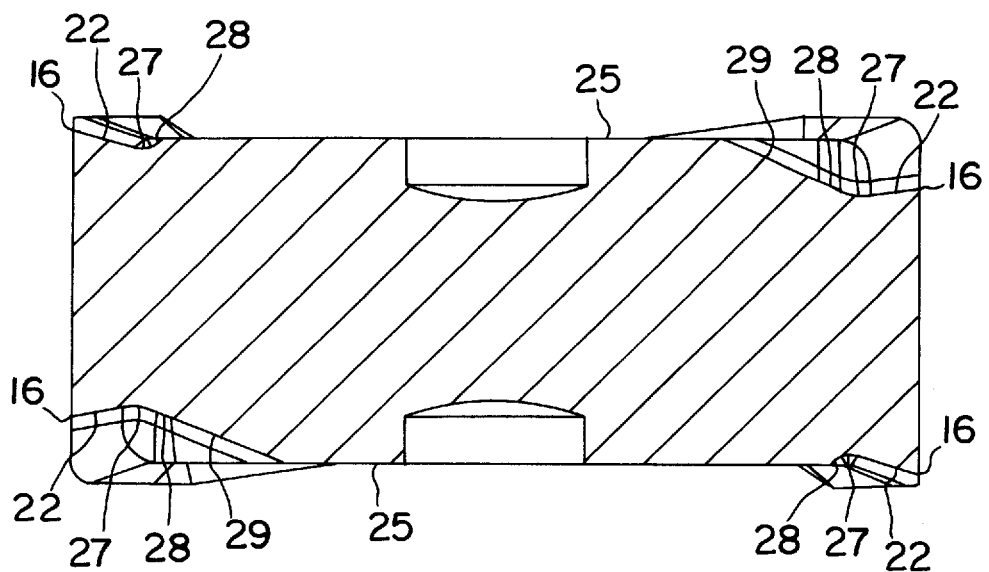
FIG. 28 is a section along line G—G of FIG. 24.
Figure 29:
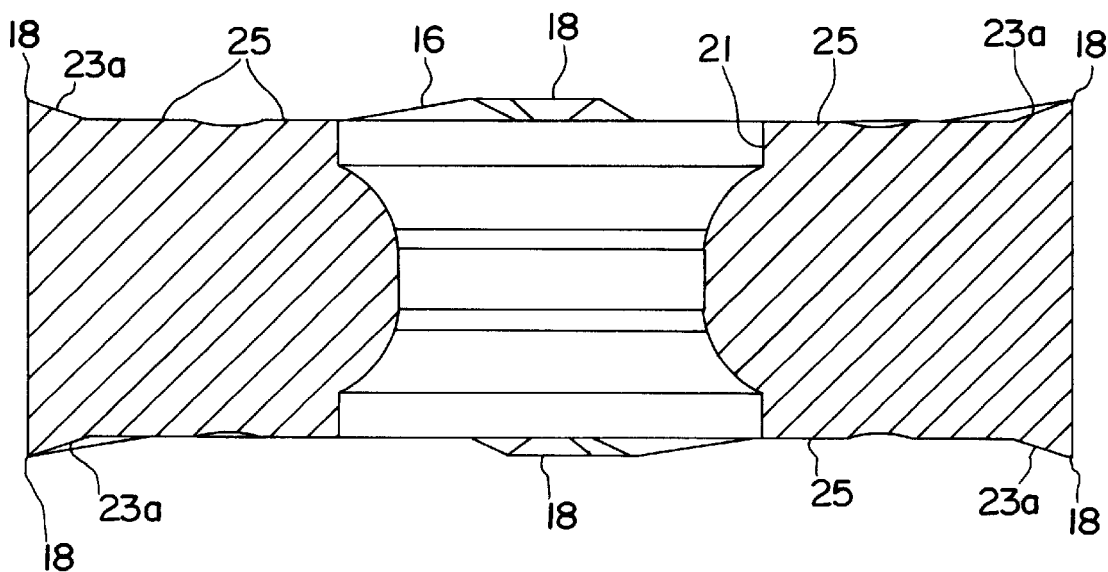
FIG. 29 is a section along line V—V of FIG. 24.

FIGS. 23, 24 and 25 are a perspective view, a plan view and a front view of a throw-away tip according to the fifth embodiment of the invention, respectively. FIGS. 16 to 29 are sections along line E—E, line F—F, line G—G, and line V—V of FIG. 24, respectively.

A throw-away tip 12 shown in FIGS. 23 to 29 is of negative type and has a substantially square shape. Opposite upper and lower surfaces 14, 13 are so configured as to be identical and rotationally symmetrical with respect to the vertical direction. Thus, the description is directed to the configuration of the upper surface 14 but the same description applies to the lower surface 13. The throw-away tip 12 includes four side surfaces 15 and bevel faces 17 which partly constitute the sides of the throw-away tip 12 and which are formed by cutting off the respective corners in the vertical direction. Ridges formed by intersection of the upper surface 14 with the side surfaces 15 act as main cutting edges 16, whereas ridges formed by intersection of the upper surface 14 with the bevel faces 17 act as auxiliary cutting edges 18.

Regarding the cutting edges, corners, bevel faces and the like reference is given to the description of the preceding embodiments.

In the middle of the tip 12, there is formed a through hole 21 for a clamping screw.

In the upper surface 14, a rake face 22 of each main cutting edge 16 is gradually inclined toward the lower surface 13 in a direction toward the center and perpendicular to the main cutting edge 16. The rake angle a of the rake face 22 is substantially fixed at any location along the length of the main cutting edge 16. As shown most clearly in FIG. 24, the rake face 22 is formed such that its width becomes narrower along the main cutting edge 16 from one adjacent auxiliary cutting edge 18 of the main cutting edge 16 toward the other adjacent auxiliary cutting edge 18 thereof in the plan view of FIG. 24. However in other variations of this embodiment, the width of the rake face 22 may be constant or may become gradually wider.

The rake face 22 is curved steeply upwardly in the vicinity of the other adjacent auxiliary cutting edge 18, abutting on a rake surface 23a of the other adjacent auxiliary cutting edge 18. Each cutting edge 19 between the main and auxiliary cutting edges 16 and 18 is also formed with a rake face 23b. The rake faces 23a, 23b are also gradually inclined toward the lower surface in directions toward the center away from the corresponding cutting edges, thereby forming positive rake angles.

As shown in FIGS. 23 and 25, a seating surface 25 substantially in the shape of a well crib when viewed from above is formed on the upper surface 14 around the through hole 21. The seating surface 25 has substantially V-shaped ridges 25a such that a spacing between each ridge 25a and the corresponding main cutting edge 16 becomes gradually wider in a direction away from the one adjacent auxiliary cutting edge 18 and then becomes gradually narrower in the vicinity of the other adjacent auxiliary cutting edge 18. The seating surface 25 is contiguous with the rake faces 23a, 23b of the auxiliary cutting edges 18 at the respective corners.

A breaker groove 26 is formed between each main cutting edge 16 and the seating surface 25. In each breaker groove 26, a concavely curved portion 27 and a first slanted face 28 which is flat and moderately sloped upwardly are formed in this order inwardly of the rake face 22 along a direction perpendicular to the main cutting edge 16 (see FIGS. 24, 26, 27 and 28). The first slanted surface 28 extends to the seating surface 25 in an area close to the one adjacent auxiliary cutting edge 18.

Further, in an area near the innermost part of each ridge 25a of the seating surface 25, i.e. an area away from the one adjacent auxiliary edge 18, a second slanted face 29 which is convexly curved and more moderately sloped upwardly than the first slanted face 28 is formed between the first slanted face 28 and the seating surface 25.

The thus constructed throw-away tip 12 according to the fifth embodiment has further to the features and advantages of the preceding embodiments the following advantages. Since each breaker groove 26 gradually widens along the corresponding main cutting edge 16 away from the one adjacent auxiliary cutting edge 18, when the tip 12 makes a shallow cut, thin chips being produced are easily curled, due to the narrow width of the breaker groove 26, without elongating, thereby being smoothly discharged. When the tip makes a shallow or averagely deep cut, chips come into contact with the first slanted face 28, thereby being curled. When the tip makes a deep cut, chips are smoothly removed due to the wide width of the breaker groove 26, and come into contact with the second slanted face 29 which is more moderately sloped than the first slanted face 28, thereby being curled. Accordingly, chips are more smoothly removed, thereby preventing an occurrence of clogging and, thus, reducing a cutting load. Further, since the seating surface 25 is located higher than the main cutting edges 16, chips are smoothly discharged without being clogged in any event regardless of whether the tip 12 makes a shallow, averagely deep, or deep cut.

The seating surfaces 25 formed on the respective upper and lower surfaces 14, 13 act to make the entire tip 12 thicker, making the tip 12 free from cracks and fractures, i.e. enhancing the strength of the tip. Particularly, since the seating surface 25 is contiguous with the auxiliary cutting edges on the respective corners, the tip 12 can be stably seated on the cutter 9 and has a high strength near its corners. Further, since the tip 12 is of negative type, it can be easily molded by pressing and the strength of the cutting edges can be ensured.

The throw-away tip 12 having the main cutting edges 16, the auxiliary cutting edges 18, etc. formed both on the upper and lower surfaces 13 and 14 has an advantage that precision of dimensions are easily manageable since the plurality of auxiliary cutting edges 18 on each surface are located on the same imaginary plane. There is another advantage that the shape of the cutting edges and the positions thereof does not change upon a corner change.

The first slanted face 26 of each breaker groove 26 may be a concave or convex face, instead of a flat face. The second slanted face 29 may be a concave or flat face, instead of the convex face.

Although the rake angle $\alpha$ is fixed in the foregoing embodiment, it may be variable. Specifically, the rake face 22 may be formed such that the rake angle $\alpha$ becomes gradually larger or smaller along the extension of the main cutting edge 16.

Further, the main cutting edges 16 are linearly inclined due to the fixed angle of inclination $\beta$ in the foregoing embodiment. The angle of inclination $\beta$ may gradually vary along the extension of the main cutting edges 16 so that the main cutting edges 16 are inclined gradually toward the lower surface 13 in a direction away from the one adjacent cutting edge 18. For example, by varying the angle of inclination $\beta$, each main cutting edge 16 forms a concave or convex curve and is gradually inclined toward the lower surface 13 in the direction away from the one adjacent cutting edge 18.

In this way, the tip strength and chip discharging ability can be suitably adjusted.

Although the throw-away tip 12 has a substantially square shape in the foregoing embodiments, the shape thereof is not limited to it. It should be appreciated that the tip 12 may be substantially in the form of a quadrilateral such as rhombus, a rectangle and a parallelogram or in the form of a triangle, or in the form of any polygon.

Further, the main cutting edges 16 and the auxiliary edges 18 of the throw-away tip 12 may be subjected to honing or may be formed with a flat land.

The throw-away tip according to the fifth embodiment has a good chip discharging ability because each main cutting edge is inclined toward the lower surface in the direction away from the corresponding auxiliary cutting edge; a good cutting performance because the rake angle of each main cutting edge is positive; and a good seating stability when being mounted on a cutter because the flat seating surface is formed in the center of the upper and lower surfaces. The seating surface also acts to make the entire tip thicker, making the tip free from cracks and fractures during cutting and enhancing its strength. Further, the seating surface having a height lower than the main cutting edges prevents clogging of chips and makes a cutting load smaller. As a result, the chip discharging ability of the tip can be further improved.

When the tip makes a shallow cut, thin chips are curled without elongating, thereby being smoothly discharged. When the tip makes a deep cut, chips are smoothly discharged since the width of the breaker grooves becomes wider.

When the tip makes a shallow or averagely deep cut, chips being removed along the rake faces of the main cutting edges come into contact with the first slanted faces of the breaker grooves, thereby being curled. When the tip makes a deep cut, chips are removed along the second slanted faces, thereby suitably being curled and discharged.

The throw-away type cutter is mounted with the throw-away tip according to one of the preceding embodiments such that an axial rake angle, a corner angle and an angle of inclination are set in a range of $-4°$ or smaller, a range of $25°$ to $60°$ and a range of $0°$ or larger, respectively to produce and discharge spiral chips during cutting. Accordingly, cutting can be performed even when the axial rake angle and the radial rake angle are both negative and, as compared with a case where a throw-away tip having parallel opposite surfaces is mounted under similar conditions, the actual angle of inclination and true rake angle can be increased in the positive direction, i.e. can both take positive values. As a result, the cutter is allowed to have improved cutting performance and chip discharging ability, is not subject to clogging, and has a good seating stability.

Further, by mounting the inventive throw-away tip, as compared with a case where a throw-away tip having parallel opposite surfaces is mounted under similar conditions, the actual angle of inclination and true rake angle can be increased in the positive direction, i.e., can both take positive values, and the chip discharging ability and cutting performance can be improved. Further, the tip can be seated with improved stability; chips can be smoothly removed; and a cutting load can be reduced.

The throw-away tip 12 as constructed above is mounted on a throw-away type cutter 9 shown in FIG. 11 such that the tip angles thereof are, for example, same as those of the aforementioned prior art tip 1: the axial rake angle A, the corner angle CH, and the angle of inclination I are set in a range of −10° to −4°, a range of 25° to 60°, and a range of +5° or larger, respectively, and the equation (6):

$$\tan I = \tan A \cdot \sec CH - \tan T \cdot \tan CH$$

is satisfied.

It should be noted that the lines of the main cutting edge as a basis for setting the axial rake angle and the like are imaginary lines connecting the adjacent auxiliary cutting edges 18, 18 of this embodiment and corresponding to the main cutting edges 5 of the prior art tip.

Then, an actual angle of inclination (I+β) is increased in a positive direction because the main cutting edges 16 of the tip 12 have the angle of inclination β, thereby improving the ability of the tip 12 to discharge spiral chips.

An actual true rake angle (T+α) is also increased in the positive direction because the rake faces 22 of the tip 12 form the varying rake angle α, thereby improving the cutting performance of the tip 12.

By suitably selecting the respective numerical values, both the actual angle of inclination and the actual true rake angle can take positive values.

Specific examples of numerical values of the respective angles when the throw-away tip 12 according to this embodiment is mounted on the cutter 9 are: the axial rake angle=−5°03′, the radial rake angle R=−14°46′, the corner angle CH=44°47′, the true rake angle T=−14°, and the angle of inclination I=7°. In this case, the actual angle of inclination and true rake angle are increased in the positive direction by (+β°) and (+α°), respectively.

Further, as compared with a cutter mounted with a throw-away tip having a flat shape and parallel opposite surfaces, the throw-away type cutter according to the foregoing embodiment can improve the cutting performance of the cutting edges 16 and the ability of the tip 12 to discharge spiral chips without changing (may be changed) the conditions under which the tip is mounted on the cutter 9 to discharge the spiral chips.

Further, in the case that the throw-away tip 27 is mounted on a tip mounting seat of the cutter 9 or the like, if a seat having an upper surface shaped in conformity with the configuration of a seating surface of the tip 27 (the lower or upper surface 13 or 14) is used, the tip 27 can be firmly secured to the cutter 9 without damaging the cutting edges formed on the surface which is not to be used for cutting.

Further, the throw-away type cutter according to the foregoing embodiment has improved cutting performance and chip discharging ability since the rake faces 22 of the main cutting edges 16 form the rake angle α and angle of inclination β. Accordingly, as compared with a cutter mounted with a throw-away tip having a flat shape and parallel opposite surfaces, the cutter according to the foregoing embodiment can improve the cutting performance of the cutting edges 16 and the ability of the tip 12 to discharge spiral chips without changing (may be changed) the conditions under which the tip is mounted on the cutter 9 to discharge the spiral chips.

Further, when the throw-away tip 12 is mounted on the cutter 9, because of the rake angle α and the angle of inclination β of the main cutting edges 16, it may not be necessary to set the tip angles in the same ranges as the prior art throw-away tip: the axial rake angle A, the corner angle CH, and the angle of inclination I are set in a range of −10° to −4°, a range of 25° to 60°, and a range of +5° or larger, respectively, and to mount the tip so as to satisfy the equation (6):

$$\tan I = \tan A \cdot \sec CH - \tan T \cdot \tan CH.$$

Next, the mounting conditions of the throw-away tip 12 according to the foregoing embodiments on the cutter 9 which improve a chip discharging ability and a cutting performance are described.

By transposing the Kronenberg's equation (2), the following equation (7) can be obtained.

$$\tan R = (\tan A \cdot \cos CH - \tan I) \cdot \csc CH \quad (7)$$

$$\tan T = \tan R \cdot \cos CH + \tan A \cdot \sin CH \quad (1)$$

$$\tan I = \tan A \cdot \sec CH - \tan T \cdot \tan CH \quad (6)$$

$$\tan R = \tan T \cdot \cos CH - \tan I \cdot \sin CH \quad (4)$$

In connection with the aforementioned conditions of the prior art and FIG. 11, if the axial rake angle A and the angle of inclination I or the true rake angle T are set as listed as conditions in TABLE-1 below, the corner angle CH is set at 25°, 45° and 60°, and these values are put into the equations (7), (1), (4) and (6), the radial rake angle R and the true rake angle T or angle of inclination I take values as shown in TABLE-1.

TABLE 1

| CONDITIONS | EQUATION | CH = 25° | CH = 45° | CH = 60° |
| --- | --- | --- | --- | --- |
| A = −4° | (7) | R = −19°39′ | R = −10°58′ | R = −8°03′ |
| I = +5° | (1) | T = −19°27′ | T = −10°34′ | T = −7°29′ |
| A = −4° | (4) | R = −20°40′ | R = −23°59′ | R = −31°15′ |
| T = −20° | (6) | I = 6°24′ | I = 14°51′ | I = 26°08′ |

Figure 13:
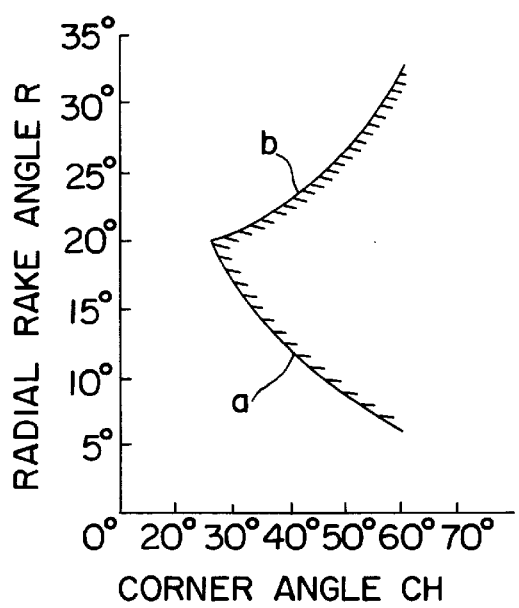
FIG. 13 is a graph showing a relationship between a radial rake angle and a corner angle.

In TABLE-1, when the conditions are: the axial rake angle A=−4° and the angle of inclination I=+5°, if the corner angle CH is smaller than 25°, it goes beyond the left lower limit of the usable region defined in FIG. 11, with the result that the true rake angle T becomes too small. Further, when the conditions are: the axial rake angle A=−4° and the true rake angle T=−20°, if the corner angle CH is larger than 60°, the radial rake angle R is in the neighbourhood of the right upper limit of the usable region of FIG. 13. Accordingly, if the true rake angle T is larger than 20°, it is too small.

In the throw-away tip 12 according to the foregoing embodiments of the invention, the main cutting edges 16 have a positive angle of inclination β. Accordingly, the angle of inclination I can be further decreased. In other words, on the basis of the aforementioned prior art, it is sufficient that β+I=+5° and, from this, the following equation (8) can be obtained:

$$I = 5° - β \quad (8)$$

If β=5°, the spiral chips can be discharged even if the angle of inclination I=0°. Further, if the angle of inclination I is largely decreased, a negative value of the true rake angle T which influences the cutting performance can be made smaller (see TABLE-2).

TABLE 2

| CONDITIONS | CH = 25° | CH = 45° | CH = 60° |
| --- | --- | --- | --- |
| A = –4° | R = –8°32' | R = –4° | R = –2°19' |
| I = 0° | T = –9°24' | T = –5°39' | T = –4°37' |
| A = –4° | R = +0°53' | R = +1°40' | R = +2°19' |
| T = –4° | T = –0°53' | T = –1°40' | T = –2°19' |

However, as seen from the bottom row of TABLE-2, if the angle of inclination I takes a negative value (e.g. –4°), the true rake angle T becomes too small. This is not preferable because it causes an insufficiently large clearance angle at the radially outward side.

Accordingly, though depending on the degree of the axial rake angle A, a preferable lower limit of the angle of inclination I suitable for cutting would be in the neighbourhood of 0° when A=–6° as shown in TABLE-3.

TABLE 3

| CONDITIONS | CH = 25° | CH = 45° | CH = 60° |
| --- | --- | --- | --- |
| A = –6° | R = –12°42' | R = –6° | R = –2°36' |
| I = 0° | T = –13°58' | T = –8°27' | T = –6°29° |

In order to discharge the spiral chips when the throw-away tip 12 of the foregoing embodiments according to the invention is mounted on the cutter 9, it is sufficient to set the axial rake angle A at –4° or smaller when the corner angle CH and the angle of inclination I are set between 25° and 60°, and 0° or larger, respectively. The axial rake angle A is preferably set between –10° and –4°, more preferably between –7° and –5°. Although the clearance angle at the radially outer side is insufficiently large when the true rake angle T=0°, the true rake angle T may take any desired negative value. The true rake angle T is preferably set between –20° and –5°, more preferably between –15° and –10°.

Particularly, examples of numerical values which provide a practically effective mounting position are: the radial rake angle R=–11°31' and the true rake angle T=–12°20' when the corner angle CH=about 45°, the axial rake angle A=–6° and the angle of inclination I=4°.

In the throw-away tip 12, if the rake angle α=25° and the angle of inclination of the main cutting edges 16 β=10°, the actual angle of inclination I=about 14° and the actual true rake angle T=about 13°.

As described above, according to the throw-away tip of the first or second embodiment, each main cutting edge is gradually inclined toward the lower surface along its extension away from one adjacent auxiliary cutting edge thereof and is curved upward to be connected with the other adjacent auxiliary cutting edge, and the rake face of each cutting edge is gradually inclined toward the lower surface along the extension of the cutting edge away from the auxiliary cutting edge and along the direction perpendicular to the cutting edge. Accordingly, the angle of inclination and the rake angle are increased to thereby improve a chip discharging ability and a cutting performance, respectively. Further, since the tip is of negative type, the cutting edges have a high strength.

Since the rake face of each auxiliary cutting edge is gradually inclined toward the lower surface in the direction perpendicular to the auxiliary cutting edge, the cutting performance can be improved.

Further, the rake faces of the main cutting edge each have a substantially fixed width over their entire length, and the inner area continuous with the rake faces is formed by the slanted flat face which is inclined in the same direction as the main cutting edges. Accordingly, the thickness of the tip when a deep cut is made can be ensured and, accordingly, the strength of the tip can be ensured.

Further, since the lower surface has the same configuration as the upper surface, the tip can be easily molded by pressing and the strength of the tip can be ensured.

Further, since a plurality of auxiliary cutting edges formed on the same surface are located on the same horizontal plane, the production precision of the throw-away tip is easily manageable.

Further, if the throw-away type cutter is mounted with the throw-away tip according to the first embodiment such that an axial rake angle, a corner angle and an angle of inclination are set in a range of –4° or smaller, a range of 25° to 60° and a range of 0° or larger, respectively to produce and discharge spiral chips during cutting. Accordingly, as compared with a case where a throw-away tip having parallel opposite surfaces is mounted under similar conditions, both the cutting performance and the ability to discharge spiral chips can be improved.

Further, when the throw-away tip according to the second embodiment is mounted on the throw-away type cutter, it is mounted on the tip mount seat via the seat having an upper surface having a configuration corresponding to that of the seating surface of the throw-away tip. Accordingly, even if the tip having the cutting edges formed on both upper and lower surfaces thereof, it can be firmly secured without damaging the cutting edges and the like on the seating surface.

According to the throw-away tip of the third or fourth embodiment, each main cutting edge is gradually inclined toward the lower surface in the direction away from the one adjacent auxiliary cutting edge, and the rake face thereof is formed into a twisted face that is inclined toward the lower surface so that the rake angle gradually changes along the main cutting edge. Accordingly, by variably setting the rake angle of the rake face depending upon a material to be cut, a required cutting characteristic, etc., the cutting performance and the tip strength can be suitably balanced according to a depth of cut. Further, the main cutting edges and the rake faces so formed as to have an angle of inclination lead to an improved chip discharging ability and a larger rake angle which in turn improves the cutting performance. Further, since the tip is of negative type, the cutting edges advantageously have a high strength.

Further, since the rake angle of each main cutting edge becomes gradually larger in the direction along the extension of the main cutting edge away from the auxiliary cutting edge, particularly for cutting of a soft material such as aluminum, the tip demonstrates a good cutting performance when it makes a deep cut.

Further, since the rake angle of each main cutting edge becomes gradually larger in the direction along the extension of the main cutting edge away from the auxiliary cutting edge, the tip demonstrates a good cutting performance when it makes a shallow cut, and the tip strength when it makes a deep cut can be ensured.

The rake face of each main cutting edge is narrow in the area where the rake angle is large, thereby making it easy to curl chips, and is wide in the area where the rake angle is small, thereby preventing clogging of chips.

Further, since each main cutting edge is formed such that its angle of inclination is fixed or gradually changes, the tip strength and the chip discharging ability are set according to the angle of inclination. As a result, the tip strength and the chip discharging ability can be suitably adjusted according to the depth of cut.

Further, since in the fourth embodiment the lower surface has the same configuration as the upper surface, there are provided many effective cutting blades. The tip can be easily molded by pressing, and the cutting edges are allowed to have a sufficient strength.

According to the throw-away tip of the fifth embodiment, each cutting edge is gradually inclined toward either one of opposite lower and upper surfaces in the direction away from the one adjacent auxiliary direction, the rake face of the main cutting edge is gradually inclined toward the lower or upper surface in the direction perpendicular to the main cutting edge, and the seating surface having a height lower than the main cutting edge is formed inward of the main cutting edge via the breaker groove. Accordingly, the tip has good cutting performance and chip discharging ability. Further, since the seating surface is located lower than the cutting edge, clogging is unlikely to occur; a cutting load is reduced; and the chip discharging ability is further improved. Because of the presence of the seating surface, the tip can be stably seated on the cutter, has an increased thickness, is free from cracks and fractures, and has a high strength.

Further, the breaker grooves are formed such that their width gradually widens along the corresponding main cutting edges away from the auxiliary cutting edges. Accordingly, when the tip makes a shallow cut, due to the narrow width of the breaker grooves, chips are curled without elongating, thereby being smoothly discharged. When the tip makes a deep cut, chips are smoothly removed due to the wider width of the breaker grooves.

Each breaker groove is formed with the first slanted face which is sloped upward inward of the rake face of the corresponding main cutting edge and is formed, in its wide area, with the second slanted face which is more moderately sloped than the first slanted face. Accordingly, when the tip makes a shallow or averagely deep cut, chips being removed along the rake faces of the main cutting edges come into contact with the first slanted faces of the breaker grooves, thereby being curled. When the tip makes a deep cut, chips are removed along the second slanted faces, thereby suitably being curled. As a result, a cutting load is reduced and the chips are smoothly discharged.

What is claimed is:

1. A negative throw-away tip (12) having a lower surface (13) and an upper surface (14), a plurality of spaced apart side surfaces (15) extending between said lower surface (13) and said upper surface (14), a plurality of spaced apart bevel surfaces (17) extending between said lower surface (13) and said upper surface (14), each said side surface (15) extending between a pair of said spaced apart bevel surfaces (17), said upper surface (14) including a plurality of main rake faces (22) intersecting said side surfaces (15) to define main cutting edges (16), said upper surface (14) further including a plurality of auxiliary rake faces (23a, 23b) intersecting said bevel surfaces (17) to define auxiliary cutting edges (18, 19), each of said main cutting edges (16) defining a length extending from a first of said auxiliary cutting edges (18, 19) to a second of said auxiliary cutting edges (18, 19), each of said main cutting edges (16) defining a first section gradually inclined toward the lower surface (13) and extending a major portion of said length from said first auxiliary cutting edge (18, 19) toward the second auxiliary cutting edge (18, 19), each said main cutting edge (16) further defining a second section curving upwardly from the first section away from the lower surface (13) and to the second auxiliary cutting edge (18, 19).

2. A throw-away tip (12) according to claim 1, wherein each said auxiliary rake face (23a, 23b) is gradually inclined toward the lower surface (13) along a direction perpendicular to the respective bevel surface (17).

3. A throw-away tip (12) according to claim 2, wherein the upper surface (14) includes slanted flat faces (24) disposed inwardly from the respective rake faces (22, 23a, 23b) each said slanted flat face (24) being inclined in the same direction as the main cutting edge (16) disposed outwardly therefrom.

4. A throw-away tip (12) according to claim 1, wherein the auxiliary cutting edges (18, 19) are located on a common horizontal plane.

5. A throw-away tip (12) according to claim 1, wherein each said main rake face (22) is gradually inclined toward the lower surface (13) along a direction perpendicular to the side surface (15) adjacent the respective main rake face (22).

6. A throw-away tip (12) according to claim 1, wherein each said main rake face (22) has a substantially uniform width over the length of the adjacent main cutting edge (16).

7. A throw-away tip (12) according to claim 1, wherein the first section of each main cutting edge (16) is formed to define an angle of inclination (β) that is uniform entirely therealong.

8. A throw-away tip (12) according to claim 1, wherein the tip (12) has recesses (26) disposed inwardly from the respective auxiliary rake faces (23a, 23b) and a tapered slanted face (25) having a height lower than the main cutting edges (16) is formed inwardly of the main cutting edges (16) and adjacent the recesses (26).

* * * * *